United States Patent
Davis et al.

(10) Patent No.: US 9,634,517 B2
(45) Date of Patent: Apr. 25, 2017

(54) BATTERY CHARGING MODE SELECTION

(71) Applicant: Lenovo (Singapore) Pte. Ltd., Singapore (SG)

(72) Inventors: Mark Charles Davis, Durham, NC (US); Bouziane Yebka, Apex, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 294 days.

(21) Appl. No.: 14/182,178

(22) Filed: Feb. 17, 2014

(65) Prior Publication Data
US 2015/0236547 A1 Aug. 20, 2015

(51) Int. Cl.
*H02J 7/00* (2006.01)
*H02J 7/04* (2006.01)

(52) U.S. Cl.
CPC .............. *H02J 7/042* (2013.01); *H02J 7/007* (2013.01); *H02J 7/0042* (2013.01); *H02J 7/0052* (2013.01); *H02J 7/0088* (2013.01); *H02J 2007/0062* (2013.01)

(58) Field of Classification Search
USPC ........................................... 320/114
See application file for complete search history.

(56) References Cited

U.S. PATENT DOCUMENTS

| | | |
|---|---|---|
| 7,170,257 B2 | 1/2007 | Oh |
| 2009/0130874 A1* | 5/2009 | Englund .............. H01R 13/645 439/131 |
| 2009/0221170 A1* | 9/2009 | Vuori .................. H01R 13/642 439/223 |

FOREIGN PATENT DOCUMENTS

| | | |
|---|---|---|
| CN | 13322860 C | 8/2007 |
| CN | 101436718 A | 5/2009 |

OTHER PUBLICATIONS

"Chinese Application No. 201510007525.2, Office Action mailed Jan. 22, 2017", (Jan. 22, 2017), 9 pgs.

* cited by examiner

*Primary Examiner* — Eric Lee
(74) *Attorney, Agent, or Firm* — Schwegman Lundberg & Woessner, P.A.

(57) ABSTRACT

A device includes a battery connector to couple to a rechargeable battery to provide power, a power manager coupled to the battery connector to charge the battery when connected to the battery connector in a first charging mode and a second charging mode, a power jack to receive a power plug, and a switch coupled to the power jack and the power manager and responsive to user actuation via the power plug to select the second charging mode.

21 Claims, 3 Drawing Sheets

BATTERY CHARGING MODE SELECTION

BACKGROUND

Mobile devices and other devices with rechargeable batteries may have different charging modes available. A normal mode may be optimized to maximize the life and performance of the rechargeable battery. However, a fast charging mode may be provided for when a user needs the device and does not have time to utilize the normal charging mode. The mode of charging may be determined by whether or not a fast charging module is enabled.

SUMMARY

A device includes a battery connector to couple to a rechargeable battery to provide power, a power manager coupled to the battery connector to charge the battery when connected to the battery connector in a first charging mode and a second charging mode, a power jack to receive a power plug, and a switch coupled to the power jack and the power manager and responsive to user actuation via the power plug to select the second charging mode.

A mobile device includes a processor, a memory coupled to the processor, a display device coupled to the processor, a battery connector to couple to a rechargeable battery to provide power, a power manager coupled to the battery connector to charge the battery in a first charging mode and a second charging mode, and a switch coupled to the power manager and responsive to user actuation to select between the first charging mode and the second charging mode.

A machine readable storage device having instructions for execution by a processor of the machine to perform receiving a power plug in a power jack, charging a battery in a first charging mode responsive to receipt of the power plug in a first manner, and charging the battery in a second charging mode responsive to receipt of the power plug in a second manner.

DETAILED DESCRIPTION

Figure 1:
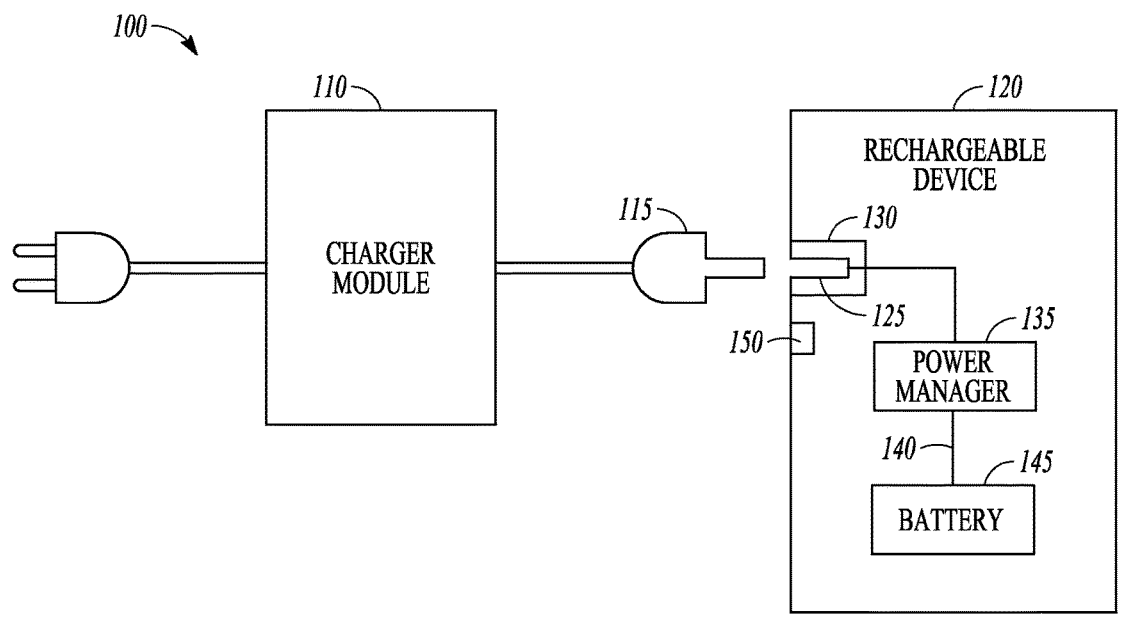
FIG. 1 is a block diagram of a system to provide multiple selectable charging modes according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of hardware based storage devices, either local or networked. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system. The article "a" or "an" means "one or more" unless explicitly limited to a single one.

Mobile devices may have a fast charging mode available for use. Various embodiments provide different methods to initiate fast charging. The methods may assume that either normal charging or fast charging is the default mode. Performance of the method changes the charging mode from the default mode to the other mode. A human perceivable indication of charging made may be provided in some embodiments, such as a light, sound, display icon, or other mechanism.

Several different methods may be used to select the charging mode. In one embodiment, a fast charging mode may be selected by pushing a power cable plug into a laptop further than normal. By pushing past a resistance, a switch may be used to activate the fast charging mode. Removing the plug would cancel fast charge mode. Alternatively, a strain gage on the power jack may be used to detect a user's intent. If the power plug is inserted with enough force that the strain gage registers past a certain threshold, fast charging may be initiated.

In further embodiments, the fast charging mode may be activated by twisting power cable plug after inserting the power cable plug in the laptop. A strain gage attached to the power jack may be used to detect the twist and activate the fast charging mode. Twisting in an opposite direction or twisting in either direction a second time may be used to cancel the fast charging mode. In this embodiment, the plug is non-round, allowing the twisting of the plug to actually apply torque that can be detected via the strain gage.

In yet a further embodiment the power jack itself may be coupled to the switch, such that moving the plug while in the power jack, such as toggling the plug activates the fast charging mode. The switch and moveable power jack could be used to detect the user's intent.

Alternatively, a switch beside the power jack on the notebook could be used to initiate fast charge mode. Either a two position switch (normal/fast) or a spring loaded switch (toggle on, toggle off) may be used. In various embodiments, the switch may comprise a mechanical switch, an electrical switch, an electromagnetic switch, or an electro-mechanical switch. Electrical switches may include for example a metal oxide semiconductor field effect transistor (MOSFET) based switch, silicon controlled rectifier (SCR), or other electronic switch.

FIG. 1 is a block diagram of a system including a charging module 110 to provide power via a power cable plug 115 to a device 120. The plug 115 plugs into a power jack 125 that is coupled to a switch 130. In one embodiment, the device 120 may be a mobile device, such as a smart phone that includes a processor, a memory coupled to the processor, and a display device coupled to the processor.

The power jack 125 may be coupled to a power manager 135 that switches between a first and a second charging mode responsive to the switch 130. The charging module 110 in one embodiment includes circuitry to provide sufficient current for a normal charging mode and a fast charging mode.

The power manager 135 has a battery connector 140 to provide current to a rechargeable battery 145 to provide power when the battery 145 is coupled to the battery connector 140. In one embodiment, the first and second power charging modes correspond to a normal charging mode and a fast charging mode.

In one embodiment, an indicator 150 is provided, such as near the power jack 125 to indicate the charging mode being used. The indicator 150 may be an LED in one embodiment with different attributes for different charging modes, such as different colors for the modes, different blinking rates, or other indications. The indicator 150 may represent an audible sound played by the device 120 to indicate the charging mode. The audible sound may include playing a sound file containing the words "fast charging mode" or "normal charging mode" in various embodiments. Still further, the indicator may represent a text or graphic display on the device screen identifying the mode. In still further embodiments, more than two charging modes may be provided.

Switch 130 may be responsive to user actuation to select between the first charging mode and the second charging mode. Such a switch is commonly known as a changeover switch. The switch 130 may operate in different ways, and be connected or integrated with the power jack 125 in various ways in different embodiments, such as by use of strain gages, toggle switches, push button switches or other switches that may be actuated via movement of the power plug 115 in the power jack 125.

Figure 2:
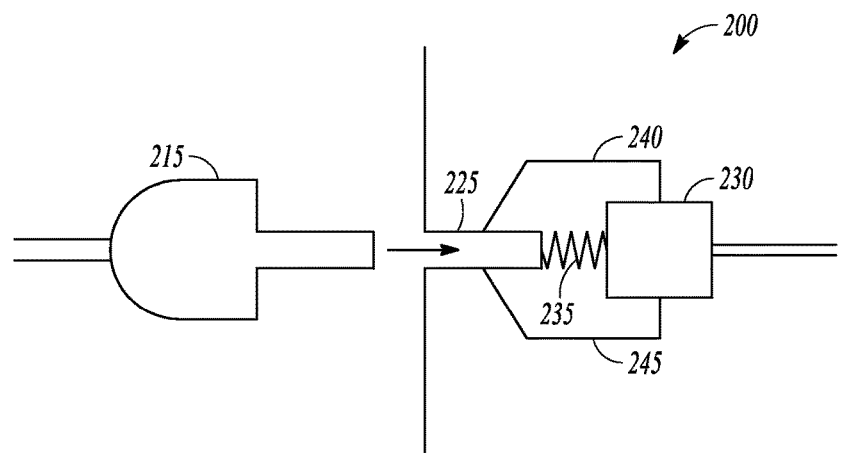
FIG. 2 is a charging mode switch responsive to pressure according to an example embodiment.

In one embodiment, illustrated in block schematic form at 200 in FIG. 2, a switch 230 is responsive to pressure exerted on a power jack 225 by an external power plug 215. A spring 235 may be used to actuate the switch when a sufficient amount of insertion force is applied to the power plug 215. As mentioned above, the switch may include one or more mechanical switches, electrical switches, magnetic switches, and electromagnetic switches in various embodiments.

A friction fit may be used to retain the power plug in the power jack when properly inserted. Forcing the plug in again, may actuate the switch again to cause the normal charging mode to be switched to. Contacts 240 and 245 may be used to supply power from the power plug to the switch 230 for routing to the power manager. The state of the switch 230 is also provided to the power manager 135 to select the proper charging mode.

Figure 3:
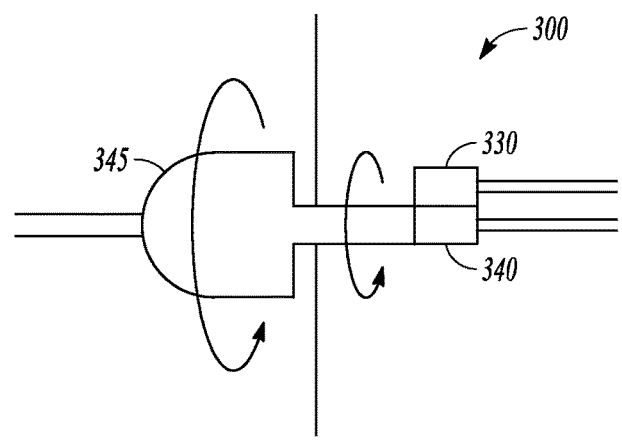
FIG. 3 is a charging mode switch responsive to torque according to an example embodiment.

In a further embodiment, illustrated in block schematic form at 300 in FIG. 3, a switch 330 may also be responsive to twisting of the external power plug being received. The switch may be a strain gage 330 positioned on a power jack 340 to detect twisting of the power plug 345. The power plug 345 and power jack 340 may be non-circular in cross section to allow transfer of torque from the twisting of the power plug by a user to the power jack 340. For instance, a USB plug, such as a micro USB plug may be used in some embodiments.

Figure 4:
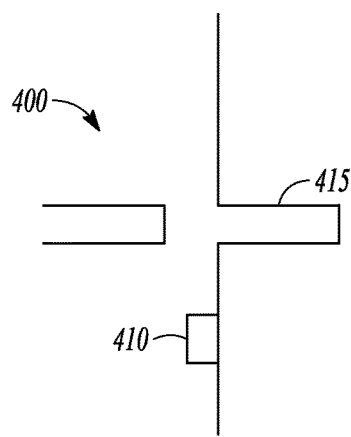
FIG. 4 is a charging mode switch proximate a power jack according to an example embodiment.

In a further embodiment illustrated in block schematic form at 400 in FIG. 4, a switch 410 may be located proximate the power jack 415, but separately actuatable by a user. The switch 410 in one embodiment is located very close to the power jack such that it is very apparent that it is associated with changing charging modes. For instance, in one embodiment, the switch is located adjacent to the power jack, or within a centimeter or two of the power jack to associate it with the charging process.

Figure 5:
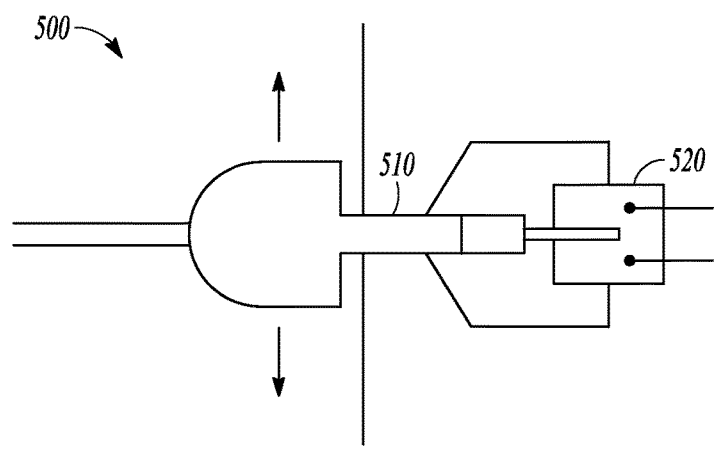
FIG. 5 is a charging mode switch coupled to a power jack according to an example embodiment.

In a further embodiment illustrated in block schematic form at 500 in FIG. 5, a power jack 510 is moveable between two positions to activate a switch 520 when the power plug is inserted in the power jack. In each of the embodiments, a separate line may be provided between the switch and the power manager 135, or the switch status may be communicated over the same conductors used to transfer power from the charging module 110 to the power manager 135.

Figure 6:
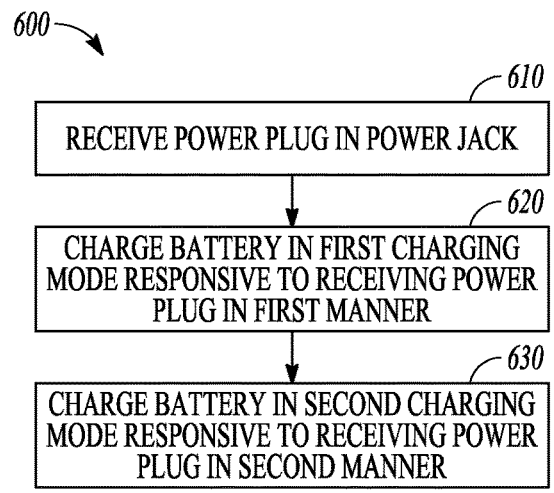
FIG. 6 is a flowchart representation of a method of selecting charging mode according to an example embodiment.

FIG. 6 is a flowchart illustration a method 600 of selecting a charging mode for a device. The method may be implemented by a processor executing instructions stored on a machine readable storage device. At 610, a power plug is received into a power jack of the device. Charging of a battery using a first charging mode is performed responsive to receipt of the power plug in a first manner at 620. When the power plug is received into the power jack in the first manner corresponding to a normal manner, the first charging mode is performed, which may correspond to a normal charging mode to preserver battery life and performance.

At 630, the battery is charged in a second charging mode responsive to receipt of the power plug in a second manner. The second charging mode may correspond to fast charging mode for use when a user prefers to have a battery charged more quickly than normal. The second manner of receiving the power plug may include the user of more insertion force than necessary to fully engage the power plug into the jack, twisting the power plug, toggling the power plug, and actuating a switch adjacent the power jack.

In one embodiment, receiving the power plug in the second manner includes detecting insertion of the power plug in the power jack beyond a set distance. In a further embodiment, receiving the power plug in the second manner includes detecting twisting of the power plug in the power jack.

Figure 7:
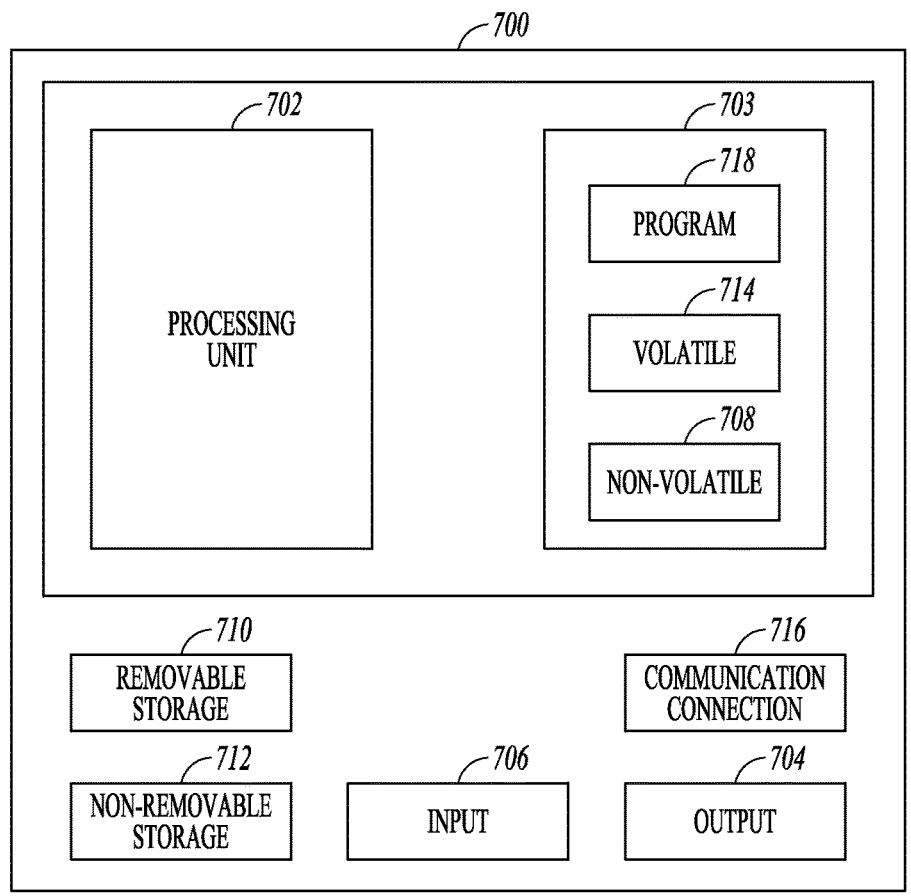
FIG. 7 is a block diagram of a system having multiple selectable charging modes and for managing power according to an example embodiment.

In one embodiment, a computer program associated with the battery power manager may be used to start or terminate fast charging FIG. 7 is a block schematic diagram of a computer system 700 to implement a controller according to an example embodiment. In one embodiment, multiple such computer systems are utilized in a distributed network to implement multiple components in a transaction based environment. An object-oriented, service-oriented, or other architecture may be used to implement such functions and communicate between the multiple systems and components. One example computing device in the form of a computer 700, may include a processing unit 702, memory 703, removable storage 710, and non-removable storage 712. Memory 703 may include volatile memory 714 and non-volatile memory 708. Computer 700 may include—or have access to a computing environment that includes—a variety of computer-readable media, such as volatile memory 714 and non-volatile memory 708, removable storage 710 and non-removable storage 712. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 700 may include or have access to a computing environment that includes input 706, output 704, and a communication connection 716. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 702 of the computer 700. A hard drive, CD-ROM, and RAM are some examples of articles including a non-transitory computer-readable medium. For example, a computer program 718 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 700 to provide generic access controls in a COM based computer network system having multiple users and servers.

EXAMPLES

1. A mobile device comprising:
a processor;
a memory coupled to the processor;
a display device coupled to the processor;
a battery connector to couple to a rechargeable battery to provide power;
a power manager coupled to the battery connector to charge the battery in a first charging mode and a second charging mode; and
a switch coupled to the power manager and responsive to user actuation to select between the first charging mode and the second charging mode.

2. The mobile device of example 1 and further comprising a power jack coupled to the power manager, the power jack to receive an external power plug, and wherein the switch is integrated into the power jack.

3. The mobile device of example 2 wherein the switch is responsive to pressure exerted on the power jack by the external power plug.

4. The mobile device of any of examples 2-3 wherein the switch is responsive to twisting of the external power plug being received.

5. The mobile device of any of examples 2-3 and further comprising a power jack coupled to the power manager and wherein the switch is located proximate the power jack.

6. The mobile device of example 5 wherein the switch is positioned within the power jack and is responsive to insertion of the power plug beyond a set distance to connect the power jack and power plug for transfer of power.

7. The mobile device of example 5 wherein the switch is coupled to the power jack and is responsive to torque applied between the power jack and the power plug.

8. The mobile device of example 7 wherein the power jack and power plug are non-circular in shape to permit transfer of torque to the switch resulting from twisting the power plug.

9. The mobile device of example 8 wherein the power plug comprises a USB connector.

10. The mobile device of any of examples 2-3 wherein the power jack is moveable between two positions to activate the switch when the power plug is inserted in the power jack.

11. A device comprising:
a battery connector to couple to a rechargeable battery to provide power;
a power manager coupled to the battery connector to charge the battery when connected to the battery connector in a first charging mode and a second charging mode;
a power jack to receive a power plug; and
a switch coupled to the power jack and the power manager and responsive to user actuation via the power plug to select the second charging mode.

12. The device of example 11 and further comprising an indicator positioned proximate the power jack to provide an indication of the charging mode selected.

13. The device of any of examples 11-12 wherein the switch is integrated into the power jack and is responsive to insertion of the power jack beyond a distance corresponding to selection of the normal charging mode.

14. The device of example 13 wherein the first charging mode is a normal charging mode and the second charging mode is a fast charging mode.

15. The device of example 14 wherein the switch is responsive to twisting of the external power plug being received.

16. The device of example 15 wherein the power jack and power plug are non-circular in shape to permit transfer of torque to the switch resulting from twisting the power plug.

17. The device of example 16 wherein the power plug comprises a USB connector.

18. A method comprising:
receiving a power plug in a power jack;
charging a battery in a first charging mode responsive to receipt of the power plug in a first manner; and
charging the battery in a second charging mode responsive to receipt of the power plug in a second manner.

19. The method of example 18 wherein receiving the power plug in the second manner includes detecting insertion of the power plug in the power jack beyond a set distance.

20. The method of example 18 wherein receiving the power plug in the second manner includes detecting twisting of the power plug in the power jack.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A mobile device comprising:
a processor;
a memory coupled to the processor;
a display device coupled to the processor;
a battery connector to couple to a rechargeable battery to provide power;
a power manager coupled to the battery connector to charge the battery in a first charging mode and a second charging mode;
a power jack coupled to the power manager to receive an external power plug; and a switch, within the mobile device, coupled to the power manager and responsive to user actuation to select between the first charging mode and the second charging mode.

2. The mobile device of claim 1 wherein the switch is integrated into the power jack prior to receiving the external power plug.

3. The mobile device of claim 2 wherein the switch is responsive to pressure exerted on the power jack by the external power plug.

4. The mobile device of claim 2 wherein the switch is responsive to twisting of the external power plug being received.

5. The mobile device of claim 2 and further comprising a power jack coupled to the power manager and wherein the switch is located proximate the power jack.

6. The mobile device of claim 5 wherein the switch is positioned within the power jack and is responsive to insertion of the power plug beyond a set distance to connect the power jack and power plug for transfer of power.

7. The mobile device of claim 5 wherein the switch is coupled to the power jack and is responsive to torque applied between the power jack and the power plug.

8. The mobile device of claim 7 wherein the power jack and power plug are non-circular in shape to permit transfer of torque to the switch resulting from twisting the power plug.

9. The mobile device of claim 8 wherein the power plug comprises a USB connector.

10. The mobile device of claim 2 wherein the power jack is moveable between two positions to activate the switch when the power plug is inserted in the power jack.

11. The mobile device of claim 1 wherein the switch comprises a switch selected from the group consisting of mechanical switches, electrical switches, magnetic switches, and electromagnetic switches.

12. A device comprising:
 a battery connector to couple to a rechargeable battery to provide power;
 a power manager coupled to the battery connector to charge the battery when connected to the battery connector in a first charging mode and a second charging mode;
 a power jack to receive an external power plug; and
 a switch integrated into the power jack and coupled to the power manager and responsive to user actuation via the external power plug to select the second charging mode.

13. The device of claim 12 and further comprising an indicator positioned proximate the power jack to provide an indication of the charging mode selected.

14. The device of claim 12 wherein the switch is integrated into the power jack and is responsive to insertion of the power jack beyond a distance corresponding to selection of the normal charging mode.

15. The device of claim 14 wherein the first charging mode is a normal charging mode and the second charging mode is a fast charging mode.

16. The device of claim 15 wherein the switch is responsive to twisting of the external power plug being received.

17. The device of claim 16 wherein the power jack and power plug are non-circular in shape to permit transfer of torque to the switch resulting from twisting the power plug.

18. The device of claim 17 wherein the power plug comprises a USB connector.

19. A method comprising:
 receiving a power plug in a power jack having an integrated switch;
 charging a battery in a first charging mode responsive to detection by actuation of the integrated switch of receipt of the power plug in a first manner; and
 charging the battery in a second charging mode responsive to detection by actuation of the integrated switch of receipt of the power plug in a second manner.

20. The method of claim 19 wherein receiving the power plug in the second manner includes detecting insertion of the power plug in the power jack beyond a set distance.

21. The method of claim 19 wherein receiving the power plug in the second manner includes detecting twisting of the power plug in the power jack.

* * * * *